United States Patent [19]
Kawasaki

[11] 4,207,589
[45] Jun. 10, 1980

[54] HUE ADJUSTMENT OF COLOR TELEVISION RECEIVER

[75] Inventor: Tsuneo Kawasaki, Yokohama, Japan
[73] Assignee: Sony Corporation, Tokyo, Japan
[21] Appl. No.: 876,236
[22] Filed: Feb. 9, 1978
[30] Foreign Application Priority Data
Feb. 17, 1977 [JP] Japan .................................. 52-16525
[51] Int. Cl.² ........................ H04N 9/535; H04N 9/62
[52] U.S. Cl. ........................................ 358/28; 358/10
[58] Field of Search ................................... 358/28, 10
[56] References Cited
U.S. PATENT DOCUMENTS
4,091,411  5/1978  Sanada et al. ........................... 358/28
4,101,928  7/1978  Sato et al. ............................... 358/28

Primary Examiner—John C. Martin
Attorney, Agent, or Firm—Lewis H. Eslinger; Alvin Sinderbrand

[57] ABSTRACT

In a color television receiver, a color television picture on a screen is blanked at a predetermined area and a first reference color image, the hue of which is varied in response to a hue control of said color television picture, and a second reference color image, the hue of which is fixed, are displayed on the screen at said blanked predetermined area. Hue control is achieved by coinciding the hue of the first reference color image with the hue of the second reference color image by means of a manually adjustable hue control circuit.

15 Claims, 25 Drawing Figures

HUE ADJUSTMENT OF COLOR TELEVISION RECEIVER

BACKGROUND OF THE INVENTION

1. Field of the Invention

This invention relates generally to a color television receiver, and more particular to a hue adjusting aid for a color television receiver.

2. Description of the Prior Art

In a conventional color television receiver, a hue of a reproduced color picture can be manually controlled by a user.

Generally, hue control is achieved by adjusting a hue control circuit so as to match the hue of the reproduced color picture with a memorized color of the user. However, it is difficult for an ordinary user to adjust the hue of the reproduced picture correctly.

Also, it is known to insert a reference signal into a color video signal and to adjust hue control circuit automatically by using this reference signal. Such method is described in U.S. Pat. No. 3,456,068. However, special equipment is needed for a broadcasting station and only viewers located in a limited area can take advantage of this method.

OBJECTS AND SUMMARY OF THE INVENTION

It is an object of this invention to provide a color television receiver in which it is easy to adjust a hue control circuit.

Another object of this invention is to provide a color television receiver having a hue adjusting aid.

Still another object of this invention is to provide a hue adjusting aid in which a reference color image is produced in a part of a reproduced color picture.

A further object of this invention is to provide a hue adjusting aid which produces a first reference color image, the hue of which is fixed, and a second reference color image, the hue of which is varied in response to a hue control of a reproduced color television picture.

According to an aspect of the present invention there is provided a color television receiver having a hue adjusting aid. The receiver comprises a luminance signal selecting circuit for separating a luminance signal from a composite color video signal, a chrominance signal selecting circuit for separating a chrominance signal from said composite color video signal, a sync signal separating circuit for separating a horizontal sync signal and a vertical sync signal from said composite color video signal, a luminance signal amplifying circuit connected to said luminance signal selecting circuit and having a blanking circuit, a blanking signal supplying circuit for supplying a horizontal blanking signal and a vertical blanking signal to the blanking circuit, a color demodulating circuit connected to said chrominance signal selecting circuit, a hue control circuit connected in association with said color demodulating circuit, and a matrix circuit for adding demodulated color difference signals to said luminance signal and supplying a color television signal to a cathode ray tube through color signal supplying lines. The hue adjusting aid comprises a pulse forming circuit connected to said sync signal separating means for producing a blanking signal, which blanks one part of a television picture on the screen of the cathode ray tube, and a timing pulse corresponding to the blanking signal, a reference color signal generating circuit for producing reference color signals for displaying a reference color image, the hue of which is varied in response to a condition of the hue control means, and a circuit for supplying the reference color signals to the color signal supplying lines.

The other objects, features and advantages of the present invention will become apparent from the following description taken in conjunction with the accompanying drawings through which like reference numerals and symbols designate the same elements.

DESCRIPTION OF THE PREFERRED EMBODIMENT

With reference to the drawings, an example of the present invention will be described.

Figure 1:
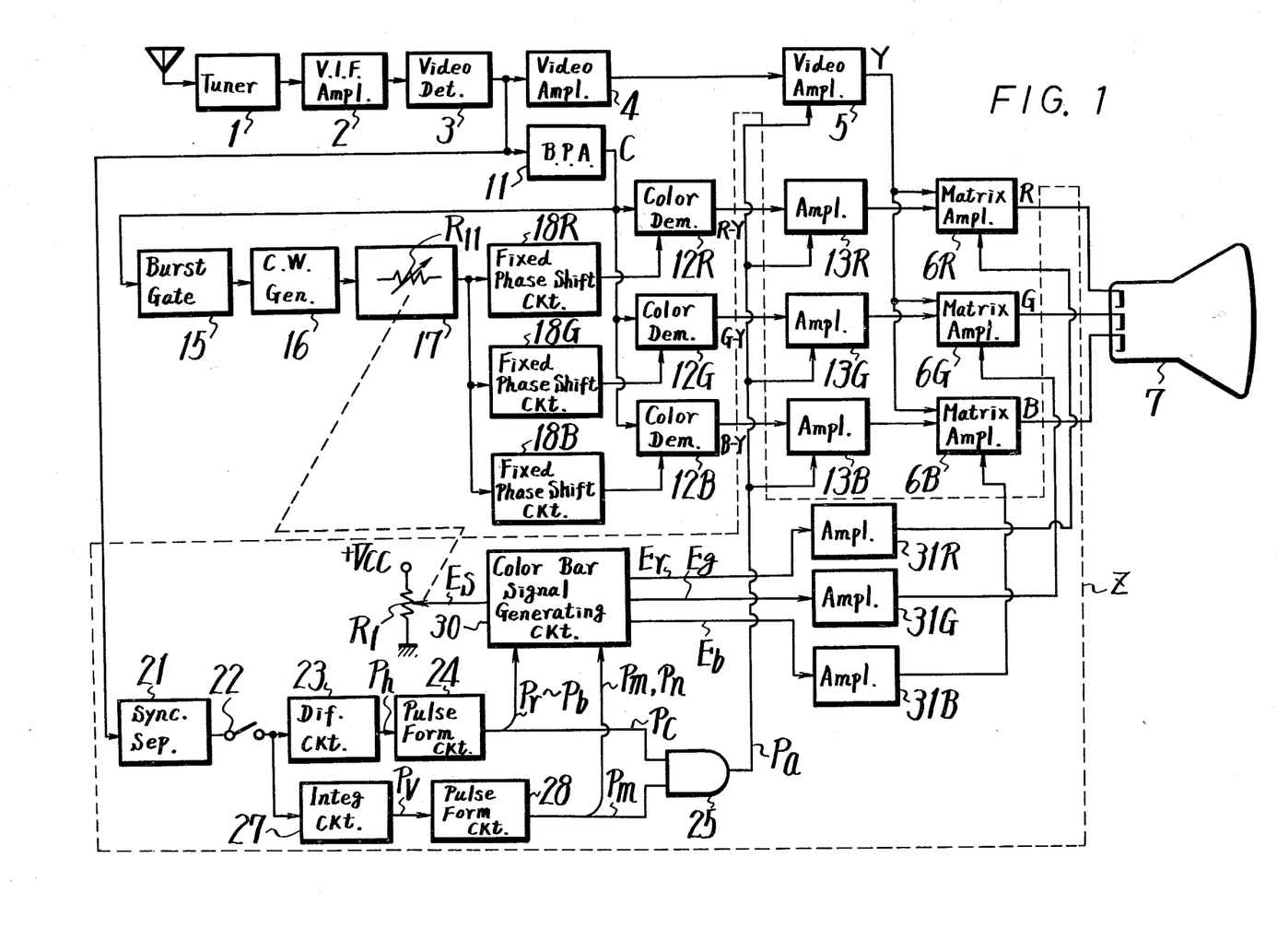
FIG. 1 is a block diagram showing a color television receiver using an example of this invention.

FIG. 1 is a block diagram showing a color television receiver which uses an example of the invention. In FIG. 1, 1 designates a tuner, 2 a video intermediate frequency (VIF) amplifier connected to the tuner 1, and 3 a video detector connected to the VIF amplifier 2, respectively. The composite video signal from the video detector 3 is applied to first and second video amplifiers 4 and 5 in order. Thus, a luminance signal Y is derived from the second video amplifier 5 and then fed to matrix amplifiers 6R, 6G and 6B, respectively.

The composite video signal from the video detector 3 is also fed to a band pass amplifier 11 which then produces a chrominance signal C. This chrominance signal C is fed to color demodulators 12R, 12G and 12B, respectively.

The chrominance signal C from the bandpass amplifier 11 is also fed to a burst gate circuit 15 from which a burst signal is derived. This burst signal is fed to a continuous wave generator 16 which generates a continuous wave signal which is fed through a variable phase shifter 17 for hue adjustment and also through fixed phase shifters 18R, 18G and 18B to color demodulators 12R, 12G and 12B as reference signals for their synchronous detection. Accordingly, the color demodulators 12R, 12G and 12B develop color difference signals of R-Y, G-Y, and B-Y, respectively. These color difference signals are fed through amplifiers 13R, 13G, and 13B, which will be described later in detail, to matrix amplifiers 6R, 6G, and 6B, respectively, which are also supplied with the luminance signal Y from the video amplifier 5. Thus, the color difference signals are added to the luminance signal. Accordingly, primary color signals of red (R), green (G), and blue (B) are developed by the matrix amplifiers 6R, 6G, and 6B, respectively. These primary color signals are applied to a color cathode ray tube 7. On the screen of color cathode ray tube 7 there is reproduced a color picture whose hue can be varied by operating a variable resistor $R_{11}$ of variable phase shifter 17.

Figure 2A:
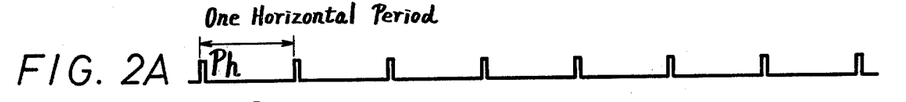
FIGS. 2A to 2R are waveform charts used for explaining the operation of the television receiver shown in FIG. 1.
Figure 2B:
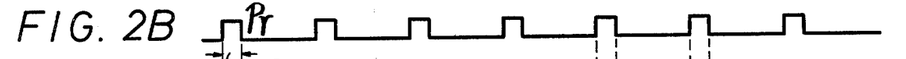
Figure 2C:
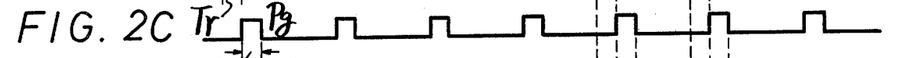
Figure 2D:
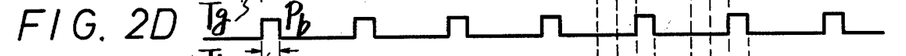
Figure 2E:
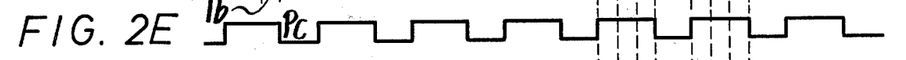

The circuit, which will display a color bar on the screen of color cathode ray tube 7 is the feature of the present invention, and will be described now in detail with reference to FIG. 1. The composite video signal from the video detector 3 is applied to a synchronizing (sync) separator 21 which then produces a composite sync pulse. This composite sync pulse is fed through a color bar display switch 22 to a differentiating circuit 23 from which a horizontal sync pulse $P_h$ shown in FIG. 2A is derived. This pulse $P_h$ is fed to a pulse forming circuit 24. This pulse forming circuit 24 then produces pulses $P_r$, $P_g$ and $P_b$ which are synchronized to the pulse $P_h$ and become "1" in substantially continuous period $T_r$, $T_g$ and $T_b$ in one horizontal scanning period as shown in FIGS. 2B, 2C and 2D and a pulse $P_c$ which becomes "1" through the periods $T_r$, $T_g$ and $T_b$ as shown in FIG. 2E.

Figure 2F:
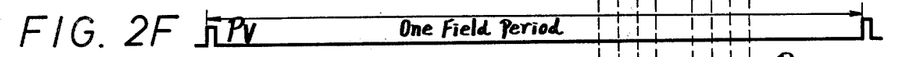
Figure 2G:
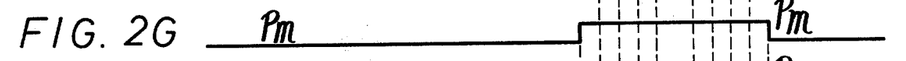
Figure 2H:
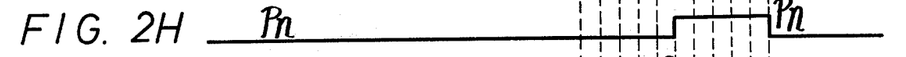

The pulse from sync separator 21 is also applied through switch 22 to an integrating circuit 27 which then produces a vertical sync pulse $P_v$ shown in FIG. 2F. This pulse $P_v$ is applied to a pulse forming circuit 28. This pulse forming circuit 28 then produces a pulse $P_m$ which is in synchronism with pulse $P_v$ and becomes "1" in continuous periods $T_m$ and $T_n$ ($T_m \cong T_n$) after the vertical scanning period as shown in FIG. 2G and also a pulse $P_n$ which becomes "1" in period $T_n$ as shown in FIG. 2H.

Figure 2I:
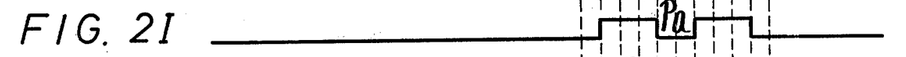
Figures 3, 5, 8:
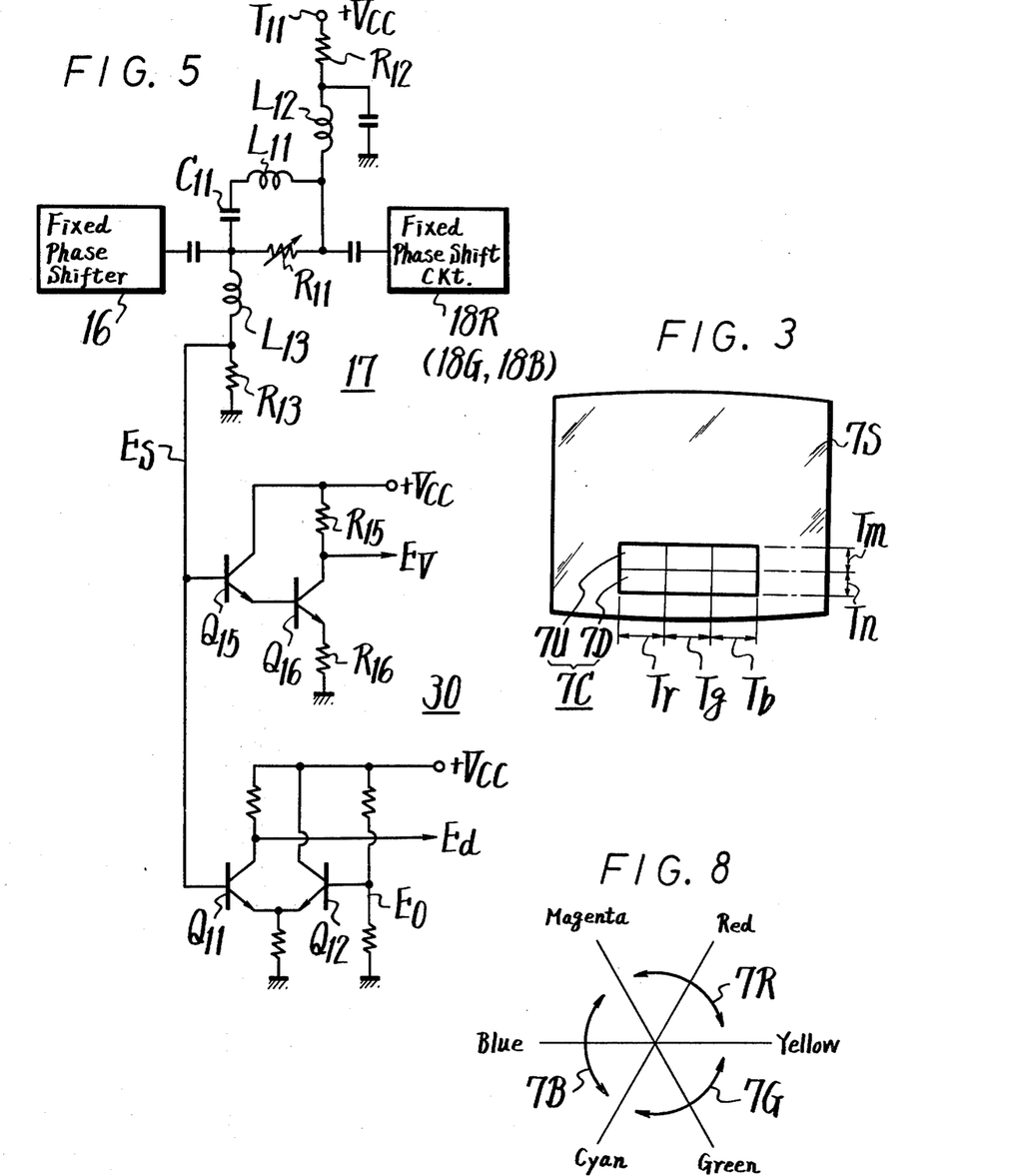
FIG. 3 is a screen illustrating a color television picture, a fixed reference color bar and a variable reference color bar.
FIG. 5 is a circuit diagram showing a variable phase shifter and one part of a color bar signal generating circuit.
FIG. 8 is a vectorial diagram used for explaining color relationships according to this invention.

The pulses $P_c$ and $P_n$ are applied to an AND circuit 25 which produces a pulse $P_a$. This pulse $P_a$ becomes "1" in the periods $T_r$, $T_g$ and $T_b$ within periods $T_m$ and $T_n$ respectively as shown in FIG. 2I. This pulse Pa is fed to amplifiers 5, 13R, 13G and 13B respectively, as a blanking pulse. Accordingly, as shown in FIG. 3, on a part or area 7C of the screen 7S of cathode ray tube 7 which area 7C corresponds to the period "1" of the pulses $P_c$ and $P_m$, the luminance signal and color difference signals are blanked and hence the broadcasting video signal is not reproduced on the area 7C.

Figure 2J:
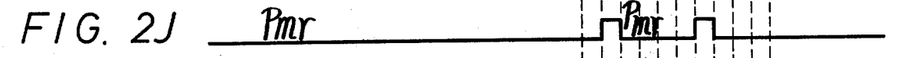
Figure 2K:
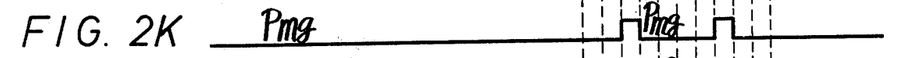
Figure 2L:
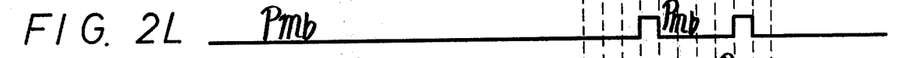
Figure 2M:
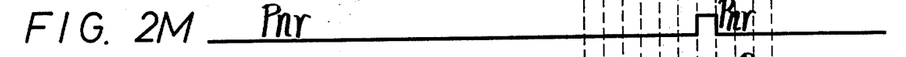
Figure 2N:
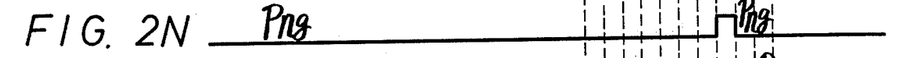
Figure 2O:
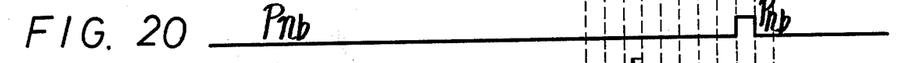
Figure 2P:
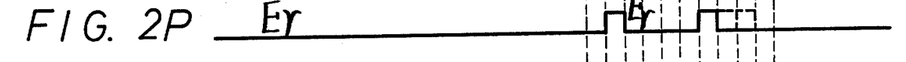
Figure 2Q:
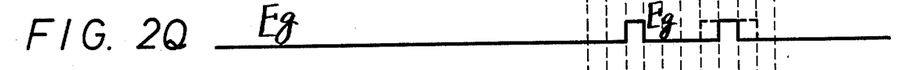
Figure 2R:
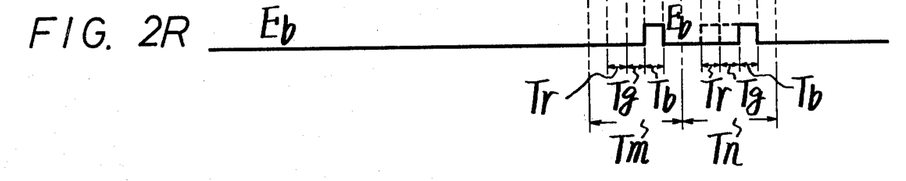

Turning back to FIG. 1, there is provided a variable resistor $R_1$ which is ganged with variable resistor $R_{11}$ of variable phase shifter 17 for hue adjustment. From the variable resistor $R_1$ there is derived a DC voltage $E_s$ whose level is varied in response to the hue adjustment. This DC voltage $E_s$ is fed to a color bar signal generating circuit 30 which is also supplied with the pulses $P_r$, $P_g$, $P_b$, $P_m$ and $P_n$ from the pulse forming circuits 24 and 28. Then, the color bar signal generating circuit 30 develop color bar voltages $E_r$, $E_g$ and $E_b$ in periods $T_m$ and $T_n$ as shown in FIGS. 2P, 2Q and 2R. The voltages $E_r$, $E_g$ and $E_b$ are generated only in periods $T_m$ and $T_n$. In this case, in period $T_m$ the voltages $E_r$, $E_g$ and $E_b$ are generated in periods $T_r$, $T_g$ and $T_b$, respectively, and their level is constant regardless of voltage $E_s$ (i.e. hue adjustment). In period $T_n$, however, the voltage $E_r$ in period $T_r$ is of a predetermined level regardless of voltage $E_s$ as shown in FIG. 2P by the solid line, but the voltages $E_g$ and $E_b$ in period $T_r$ are varied by the operation of variable resistor $R_{11}$ as shown in FIGS. 2Q and 2R by dotted lines. That is, when resistor $R_{11}$ is adjusted to a correct hue position (which will be referred to hereafter as a hue center), the levels of voltages $E_g$ and $E_b$ are zero, but when, for example resistor $R_{11}$ is turned right from the hue center, the voltage $E_g$ increases from the zero level while the voltage $E_b$ is remained zero in level. On the contrary, when resistor $R_{11}$ is turned left from the hue center, while the voltage $E_g$ remains at the zero level, the voltage $E_b$ increases from the zero level. The voltages $E_r$, $E_g$ and $E_b$ in periods $T_g$ and $T_b$ are similarly varied in level.

The voltages $E_r$, $E_g$ and $E_b$ are fed through amplifiers 31R, 31G and 31B to amplifiers 6R, 6G and 6B, respectively. Accordingly, on the area 7C of screen 7S there are displayed color bars corresponding to the voltages $E_r$, $E_g$ and $E_b$, respectively. In this case, on an upper portion 7U of area 7C which portion 7U corresponds to the period $T_m$, there are displayed pure color bars of red, green and blue since in the period $T_m$ the voltages $E_r$, $E_g$ and $E_b$ are of a constant predetermined level. On the portion 7D of area 7C, which corresponds to the period $T_n$, there are displayed pure color bars of red, blue and green. The color bars in the lower portion 7D are similar to those on the upper portion 7U when variable resistor $R_{11}$ is adjusted at the hue center since among the levels of voltages $E_r$, $E_g$ and $E_b$ are at a constant predetermined level. However, when the variable resistor $R_{11}$ is turned from the hue center, the hue on the color bars is varied in accordance with its deviation therefrom.

When the setting of the variable resistor $R_{11}$ is changed from the hue center, the hue of a reproduced color picture on the screen 7S is varied. Simultaneously the hue of the color bar on the area 7D is varied in concert with the hue variation of the reproduced picture. In this case, however, the hue of the color bar on the area 7U is not varied. Accordingly, if the hue adjustment is carried out in such a manner that the hue of the color bars on the area 7D coincides with the hue of the color bars on the area 7U which is taken as a reference hue, the reproduced color picture on the screen 7S at this time becomes correctly adjusted for hue. It is also possible that if the hue of the color bars on the area 7D is adjusted as that on the area 7U as the reference, the hue of a reproduced color picture on the screen 7S can be selected arbitrarily.

If the color bar display switch 22 is turned off, the sync pulse is not supplied to the circuits 23 and 27. Therefore, no pulses $P_c$, $P_m$ and hence no voltages $E_r$, $E_g$ and $E_b$ are produced. As a result, no color bars are displayed on the screen 7S and hence the screen 7S becomes an ordinary picture reproducing screen. In FIG. 1, a dotted line block Z marks a circuit which is added to the prior art color television receiver so as to achieve the above feature of the present invention.

Next, practical connections of some parts of the circuit shown in FIG. 1 will be now described.

Figures 4, 7:
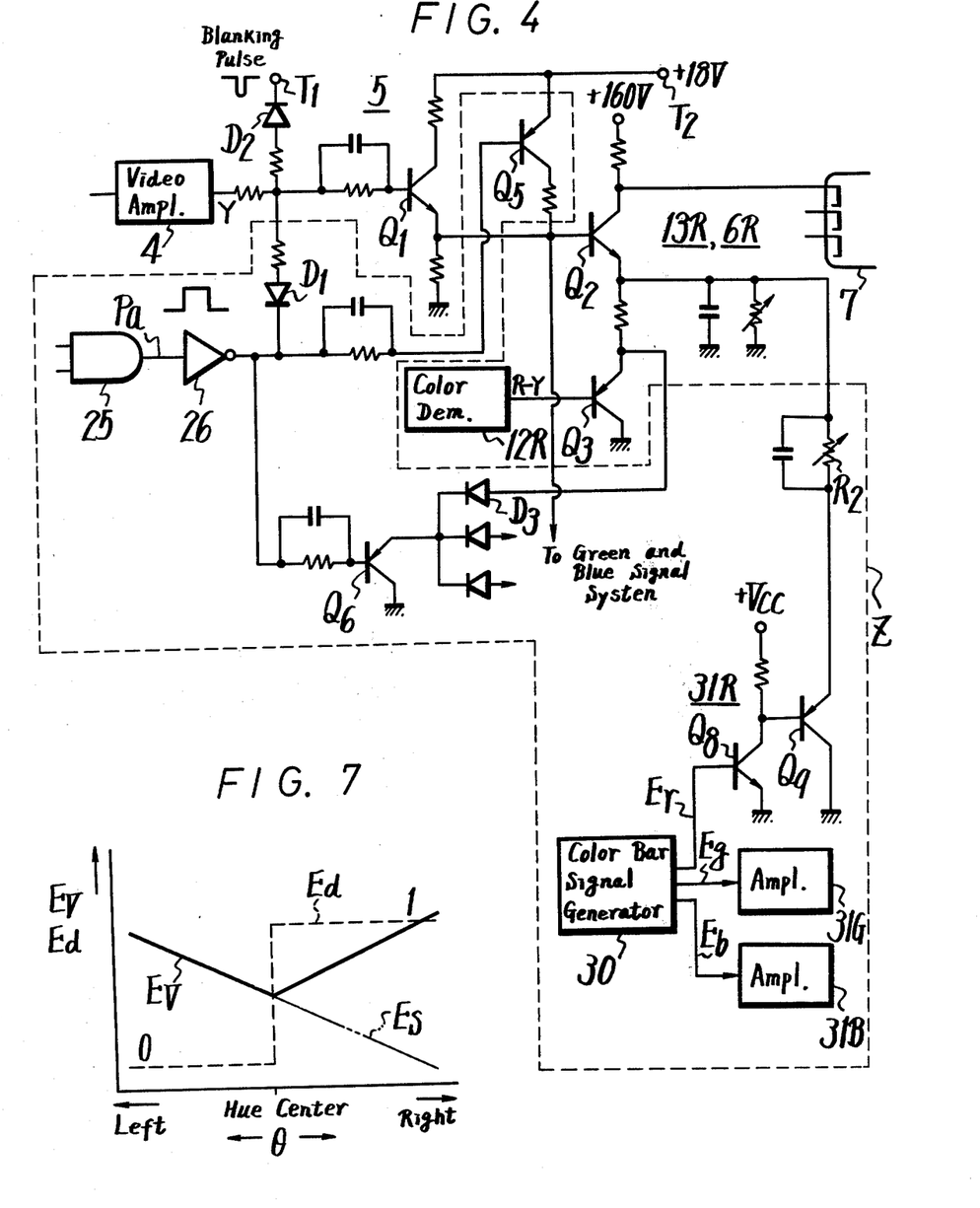
FIG. 4 is a circuit diagram showing a video amplifier, a matrix circuit, a color television signal amplifier and a reference color signal amplifier.
FIG. 7 is a chart showing a relationship between the position of a potentiometer and control voltages.

FIG. 4 shows examples of video amplifier 5, matrix amplifier 6R, difference color signal amplifier 13R and color bar signal amplifier 31R. In this example, the video amplifier 5 is formed of a transistor $Q_1$ arranged as a emitter-follower and amplifiers 6R and 13R are formed of transistors $Q_2$ and $Q_3$ which are connected in series with each other. The luminance signal from video amplifier 4 is fed through transistor $Q_1$ *to the base of transistor* $Q_2$ and the red color difference signal from color demodulator 12R is fed to the base of transistor $Q_3$. Accordingly, the red primary color signal is derived from the collector of transistor $Q_2$ and then fed to cathode ray tube 7. A terminal $T_1$ connected through a diode $D_2$ to the base of transistor $Q_1$ is supplied with negative horizontal and vertical blanking pulses.

The blanking pulse $P_a$ from AND circuit 25 is fed through an inverter 26 and a diode $D_1$ to the base of transistor $Q_1$. Between a power source terminal $T_2$ of, for example, $+18V$ and the base of transistor $Q_2$ there is connected the emitter-collector path of transistor $Q_5$ whose base is supplied with the output pulse from inverter 26. Further, between the emitter of transistor $Q_3$ and the ground, there is connected through a diode $D_3$ the emitter-collector path of transistor $Q_6$ whose base is supplied with the output pulse from the inverter 26.

The color bar signal amplifier 31R is formed of transistors $Q_8$ and $Q_9$. The emitter of transistor $Q_9$ is connected through a variable resistor $R_2$ to the emitter of transistor $Q_2$.

Accordingly, since during periods $T_m$ and $T_n$ except during periods $T_r$, $T_g$ and $T_b$ the pulse $P_a$ is "0", the output of inverter 26 becomes "1". Thus, the diode $D_1$ and transistors $Q_5$, $Q_6$ become cut off and consequently the cathode ray tube 7 is supplied with the red primary color signal similar to a conventional television receiver. In these periods, voltages $E_r$, $E_g$ and $E_b$ are not produced.

In the periods $T_r$, $T_g$ and $T_b$ within periods $T_m$ and $T_n$, the pulse $P_a$ is "1" and hence the output pulse from inverter 26 becomes "0". Thus, the diode $D_1$ becomes on and transistor $Q_1$ is cut off with the result that the luminance signal is cut off. At the same time, transistor $Q_6$ and diode $D_3$ are made on, so that the red primary color signal is cut off and hence transistor $Q_2$ produces no red primary color signal. At this time, however, transistor $Q_5$ turns on, transistor $Q_2$ becomes active and voltage $E_r$ is fed from color bar signal generating circuit 30 through transistors $Q_8$ and $Q_9$ to transistor $Q_2$, so that the color bar is displayed on the area 7C of screen 7S.

In FIG. 4, a dotted line block Z corresponds to the block Z in FIG. 1. From FIG. 4 it will be understood that the circuit of the invention can be easily added to a conventional color television receiver.

Figure 6:
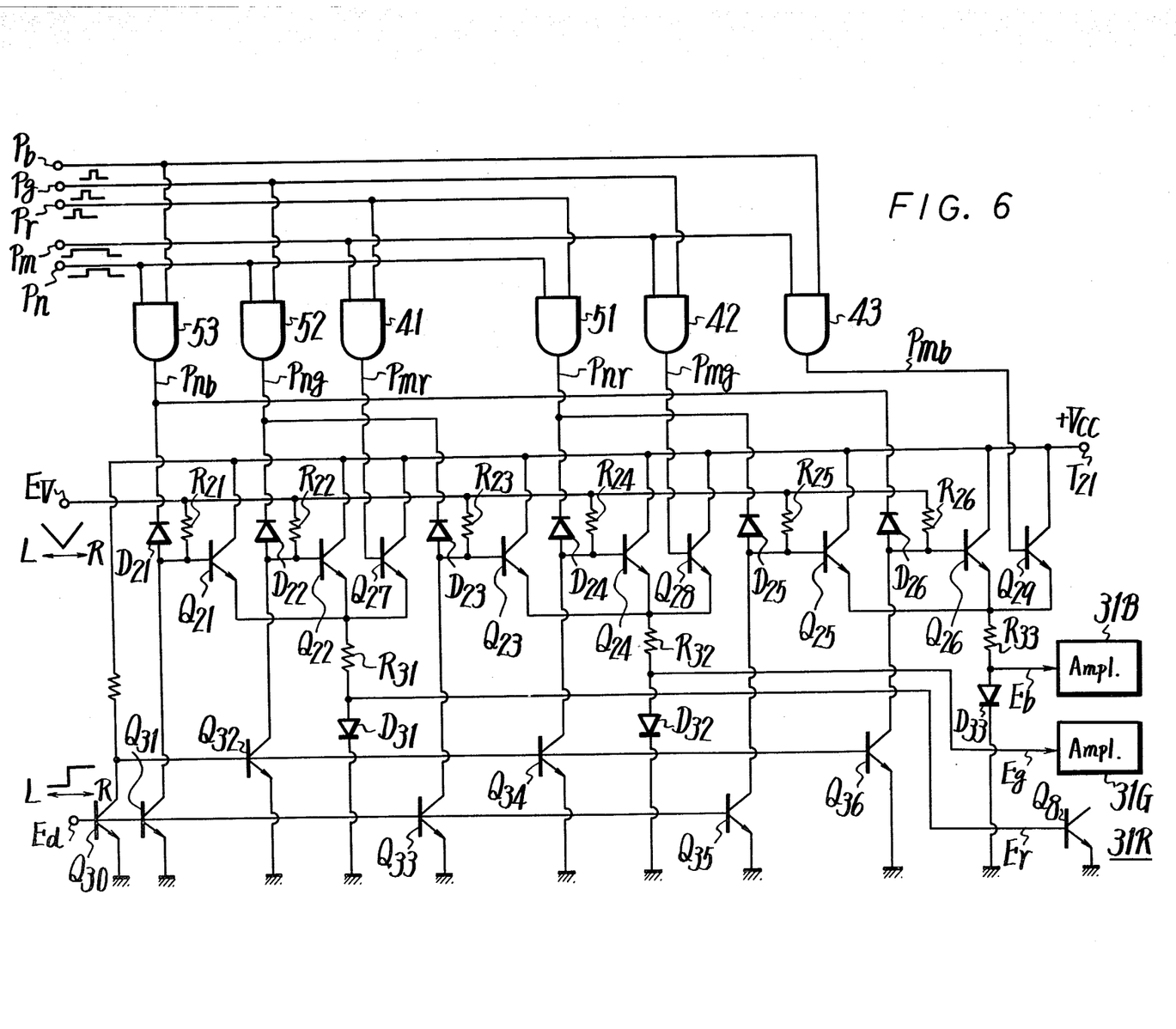
FIG. 6 is a circuit diagram of the other part of the color bar signal generating circuit.

FIGS. 5 and 6 show an example of color bar signal generating circuit 30. In this example, the position of the sliding contact of the variable resistor $R_{11}$, that itself determines the hue adjustment, also determines the voltage $E_S$. that voltage $E_S$ corresponds to the rotational position of the sliding contact of turning amount of variable resistor $R_{11}$ and from the voltage $E_s$ there are derived a voltage $E_d$ which shows the turning direction of the sliding contact of variable resistor $R_{11}$ from the hue center position and a voltage $E_v$ which shows the turning amount $\theta$ from the hue center position, as shown in FIG. 7. The values of voltages $E_d$ and $E_v$ determine the color bar voltages $E_r$, $E_g$ and $E_b$.

FIG. 5 is an example of a circuit part of color bar signal generating circuit 30 which produces voltages $E_d$ and $E_v$. In the example of FIG. 5, the variable resistor $R_{11}$ is connected in parallel to a series circuit of a capacitor $C_{11}$ for DC blocking and a coil $L_{11}$ to form a variable phase shifter circuit 17. Resistors $R_{12}$, $R_{11}$ and $R_{13}$ are connected in series through choke coils $L_{12}$ and $L_{13}$ between a power source terminal $T_{11}$ of $+V_{cc}$ and the ground, by which the voltage $E_s$ showing the turning amount of variable resistor $R_{11}$ is developed.

The voltage $E_s$ thus developed is fed to the base of transistor $Q_{11}$ which forms a differential amplifier together with a transistor $Q_{12}$. This transistor $Q_{12}$ is supplied at its base with a voltage $E_o$ which is equal to voltage $E_s$ when resistor $R_{11}$ is at the hue center. Accordingly, from the collector of transistor $Q_{11}$ there is derived the voltage $E_d$ which becomes "1" when the variable resistor $R_{11}$ is turned to right from the hue center but becomes "0" when turned to left as shown by the dotted line in FIG. 7, i.e. which voltage $E_d$ shows the turning direction of variable resistor $R_{11}$ from the hue center. In other words, when variable resistor $R_{11}$ is turned to right from the hue center and its resistance value becomes high, the base voltage $E_s$ of transistor $Q_{11}$ becomes low as shown in FIG. 7 and consequently transistor $Q_{11}$ becomes cut off with its collector voltage being "1". On the contrary, when the variable resistor $R_{11}$ is turned to left from the hue center and its resistance value becomes low, the base voltage $E_s$ of the transistor $Q_{11}$ increases as shown in FIG. 7, so that transistors $Q_{11}$ becomes turned on and its collector voltage becomes "0".

The voltage $E_s$ is also fed through the base of transistor $Q_{15}$, which is of the emitter-follower configuration, to the base of transistor $Q_{16}$ to which resistors $R_{15}$ and $R_{16}$ are connected. In this case, transistor $Q_{16}$ is so set that it is saturated when variable resistor $R_{11}$ is turned to left from the hue center. Accordingly, at the collector of transistor $Q_{16}$ where is obtained a voltage $E_v$ which is varied as shown in FIG. 7 by the solid line. That is, when variable resistor $R_{11}$ is turned to right from the hue center, the voltage $E_s$ decreases in level. This voltage $E_s$ is inversed by transistor $Q_{16}$, so that the voltage $E_v$ increases in level as variable resistor $R_{11}$ is turned to right from the hue center. On the other hand, when variable resistor $R_{11}$ is turned to left from the hue center, the emitter current of transistor $Q_{15}$ increases and transistor $Q_{16}$ saturates and acts as a conductor. Thus, the emitter voltage of transistor $Q_{15}$, i.e. voltage $E_s$, is derived as voltage $E_v$ which increases in level as variable resistor $R_{11}$ is turned to left from the hue center. Accordingly, from the collector of transistor $Q_{16}$ there is developed the voltage $E_v$ which shows the turning amound $\theta$ of variable resistor $R_{11}$ from the hue center.

FIG. 6 shows an example of a circuit part of color bar signal generating circuit 30 which circuit part forms the color bar voltages $E_r$, $E_g$ and $E_b$ from the voltages $E_v$ and $E_d$. In the example of FIG. 6, there are provided transistors $Q_{21}$ to $Q_{29}$ whose collectors are connected together to a power source terminal $T_{21}$ of $+V_{cc}$ to be an emitter-follower configuration, respectively. The emitters of transistors $Q_{21}$, $Q_{22}$ and $Q_{27}$ are grounded together through a series circuit of a resistor $R_{31}$ and a diode $D_{31}$. The connection point between the resistor $R_{31}$ and diode $D_{31}$ is connected to the input terminal of color bar signal amplifier 31R (in this example, the base of transistor $Q_8$). The emitters of transistors $Q_{23}$, $Q_{24}$ and $Q_{28}$ are grounded together through a series circuit of a resistor $R_{32}$ and a diode $D_{32}$ and the connection point therebetween is connected to the input terminal of color bar signal amplifier 31G. Further, the emitters of transistors $Q_{25}$, $Q_{26}$ and $Q_{29}$ are grounded together through a series circuit of a resistor $R_{33}$ and a diode $D_{33}$ and the connection point therebetween is connected to the input terminal of color bar signal amplifier 31B.

The voltage $E_v$ is applied to the bases of transistors $Q_{21}$ to $Q_{26}$ through resistors $R_{21}$ to $R_{26}$ and the bases of transistors $Q_{21}$ to $Q_{26}$ are in turn grounded through the collector-emitter paths of transistors $Q_{31}$ to $Q_{36}$, respectively. A transistor $Q_{30}$ whose emitter is grounded is further provided and the voltage $E_d$ is applied to the bases of transistors $Q_{30}$, $Q_{31}$, $Q_{35}$. The collector output of transistor $Q_{30}$ is applied to the bases of transistors $Q_{32}$, $Q_{34}$ and $Q_{36}$.

The pulses $P_m$, $P_n$, $P_r$, $P_g$ and $P_b$ are fed to AND circuits 41 to 43 and 51 to 53, respectively. Then, the AND circuits 41 to 43 produce pulses $P_{mr}$, $P_{mg}$ and $P_{mb}$ which become "1" in periods $T_r$, $T_g$ and $T_b$ within periods $T_m$ and $T_n$ as shown in FIGS. 2J, 2K and 2L, respectively, while the AND circuits 51 to 53 produce pulses $P_{nr}$, $P_{ng}$ and $P_{nb}$ which becomes "1" in periods $T_r$, $T_g$ and $T_b$ within period $T_n$ as shown in FIGS. 2M, 2N and 2O, respectively. The pulses $P_{mr}$, $P_{mg}$ and $P_{mb}$ are fed to the bases of transistors $Q_{27}$ to $Q_{29}$, the pulse $P_{nr}$ is fed to the bases of transistors $Q_{24}$ and $Q_{25}$ through diodes $D_{24}$ and $D_{25}$, respectively, the pulse $P_{ng}$ is fed to the bases of transistors $Q_{22}$ and $Q_{23}$ through diodes $D_{22}$ and $D_{23}$, respectively, and the pulse $P_{nb}$ is fed to the bases of transistors $Q_{21}$ and $Q_{26}$ through diodes $D_{21}$ and $D_{26}$, respectively.

Accordingly, during periods $T_m$ and $T_n$ except during periods $T_r$, $T_g$ and $T_b$, or the periods corresponding to scanning of the screen 7S except the area 7C, the pulses $P_{mr}$, $P_{mg}$ and $P_{mb}$ become "0", so that transistors $Q_{27}$ to $Q_{29}$ are in the off state. During these periods, since the pulses $P_{nr}$, $P_{ng}$ and $P_{nb}$ are "0", the diodes $D_{21}$ to $D_{26}$ are biased forwardly by the voltage $E_v$ through resistors $R_{21}$ to $R_{26}$ and hence are in the on state. Accordingly, transistors $Q_{21}$ to $Q_{26}$ are cut off and no color bar voltages $E_r$, $E_g$ and $E_b$ are produced. Thus, no voltages $E_r$, $E_g$ and $E_b$ are applied to the amplifiers 31R, 31G and 31B.

In the period $T_r$ within period $T_m$ only the pulse $P_{mr}$ turned "1", so that transistor $Q_{27}$ becomes on and hence the voltage $E_r$ of the reference level is obtained. Accordingly, a red color bar is displayed on the area 7U of the screen 7S at the left side by the voltage $E_r$.

In the periods $T_g$ and $T_b$ within period $T_m$, the pulses $P_{mg}$ and $P_{mb}$ become "1" respectively, so that transistors $Q_{28}$ and $Q_{29}$ become turned on, respectively, and hence the voltages $E_g$ and $E_b$ are obtained. Accordingly, green and blue color bars are displayed on the area 7U of screen 7S at the center and right areas thereof by voltages $E_g$ and $E_b$, respectively. At this time, the voltages $E_r$, $E_g$ and $E_b$ for the displayed color bars are constant regardless of voltages $E_v$ and $E_d$, so that the color bars displayed on the area 7U become a reference upon hue adjustment.

In period $T_r$ within period $T_n$, the pulse $P_{mr}$ becomes "1" so that transistor $Q_{27}$ becomes turned on and consequently the voltage $E_r$ of the reference level is obtained. At the same time, the pulse $P_{nr}$ becomes "1", so that the diodes $D_{24}$ and $D_{25}$ are biased backwardly to become cut off and accordingly the voltage $E_v$ is applied to the bases of transistors $Q_{24}$ and $Q_{25}$ directly. At this time, if variable resistor $R_{11}$ is turned for example, to the right from the hue center, the voltage $E_d$ is "1" as shown in FIG. 7 and the voltage $E_v$ is in the level corresponding to the turning amount $\theta$ of resistor $R_{11}$. Therefore, by the voltage $E_d$ the transistors $Q_{30}$ and $Q_{35}$ are turned on, transistor $Q_{34}$ is in the off state, and transistor $Q_{25}$ is cut off by the on state of transistor $Q_{35}$. As a result, the voltage $E_v$ is applied through a resistor $R_{24}$ to only the transistor $Q_{24}$ from which the voltage $E_g$ having the level corresponding to that of voltage $E_v$ is derived. In other words, when the variable resistor $R_{11}$ is turned to right from the hue center, in period $T_r$ within period $T_n$ there are obtained the voltage $E_r$ of the reference level and the voltage $E_g$ whose level is varied in response to the turning amount $\theta$ of variable resistor $R_{11}$.

Accordingly, on the area 7D of screen 7S at its left side there is displayed a color bar whose color is varied by voltages $E_r$ and $E_g$ so that its hue ranges from the red to yellow color in response to hue adjustment and whose green color component is varied in level in correspondence with the operating amount $\theta$ of variable resistor $R_{11}$. In this case, if it is assumed that when the variable resistor $R_{11}$ is turned to the hue center the voltage $E_v$ becomes zero, the voltage $E_g$ increses from zero as the variable resistor $R_{11}$ is turned to right from the hue center. However, when the voltage $E_g$ is lower than such a level which corresponds to the black level, the color bar contains no green component. Accordingly, when the variable resistor $R_{11}$ is turned to a certain range from the hue center, the green does not combine with red in that color bar. Thus, there is caused such a zone in which the hue of the color bar on the left side of area 7D is remained as red and not varied, i.e. a dead zone.

However, it is so constructed that, as shown in FIG. 7, even if the variable resistor $R_{11}$ is positioned at the hue center the voltage $E_v$ does not become zero but has a predetermined level. Therefore, if the voltage $E_g$ at this time is set to have the level corresponding to the black level, the color bar becomes red at the hue center. And, if the variable resistor $R_{11}$ is turned to right even very little, the green is superposed on the red and hence the hue on the area is varied continuously from red to yellow. That is, the production of any dead zone is avoided. Accordingly, at the left side of area 7D there is displayed a color bar whose hue is varied from red to yellow, as shown in FIG. 8 by an arrow 7R, as the variable resistor $R_{11}$ is turned to right from the hue center.

In the case where the variable resistor $R_{11}$ is turned to left from the hue center, the voltage $E_d$ is "0" and the voltage $E_v$ has a level corresponding to the tuning amount $\theta$ of resistor $R_{11}$. Accordingly, in such a case transistors $Q_{30}$ and $Q_{35}$ are in off-state, transistor $Q_{34}$ is in on-state and transistor $Q_{24}$ is made off by the transistor $Q_{34}$, so that the voltage $E_v$ is applied through resistor $R_{25}$ to the base of transistor $Q_{25}$ from which the voltage $E_b$ having the level corresponding to that of voltage $E_v$ is derived. In other words, when the variable resistor $R_{11}$ is turned to left from the hue center, the voltage $E_r$ of the reference level and voltage $E_b$ having the level corresponding to the turning amount $\theta$ of variable resistor $R_{11}$ are obtained in period $T_r$ within period $T_n$. Accordingly, at the left side of area 7D of screen 7S there is displayed a color bar whose hue is varied from red to magenta, as shown in FIG. 8 by an arrow 7R, as the variable resistor $R_{11}$ is turned to the left from the hue center.

In periods $T_g$ and $T_b$ within period $T_n$ an operation similar to the above operation is carried out with the result that at the center of area 7D on screen 7S there is displayed a similar color bar whose hue is varied from green to cyan as variable resistor $R_{11}$ is turned to the right from the hue center but varied from green to yellow as variable resistor $R_{11}$ is turned to the left from the hue center, as shown in FIG. 8 by an arrow 7G, and that at the right side of area 7D on screen 7S there is displayed another similar color bar whose hue is varied from blue to magenta as the variable resistor $R_{11}$ is turned to the right from the hue center but varied from blue to cyan as variable resistor $R_{11}$ is turned to the left from the hue center, as shown in FIG. 8 by an arrow 7B.

With the present invention, if the hue adjustment is performed, the hue of a reproduced picture on the screen 7S is varied and at the same time the hue of the color bars on the area 7D is varied correspondingly. In this case, the variation of the hue can be known by comparison with the hue of the color bars on the area 7U as the reference.

As described above, according to the present invention, upon adjusting the hue the color bars are displayed on an area of the screen and its hue is varied in correspondence to the reproduced picture on the screen, so that the reproduced picture can be easily and positively adjusted to have a correct hue or desired hue.

Further, the present invention can be applied to a conventional color television receiver without changing its standard, so that the present invention can be easily utilized in any conventional television receiver.

In addition, as may be apparent from FIGS. 1 and 4, the present invention can be presented by adding the circuit Z including the color bar signal generating circuit 30 to the luminance signal system and chrominance signal system of the prior art color television receiver by utilizing the blanking circuit and matrix circuit without any requirement to change the luminance signal system and chrominance signal system. Thus the present invention is convenient for a manufacturer to practice.

In the above example, transistor $Q_3$ becomes off at the area 7C on the screen 7S, but if transistor $Q_3$ is made not off completely, the luminance of the color bar increases and hence the hue adjustment becomes easy. In this case, if a superimposed image such as a letter or the like is displayed on the area 7C of the screen 7S, the superimposed image can be seen faintly and hence the problem is avoided that the superimposed letter or the like is overlooked.

It will be apparent that many modifications and variations could be effected by one skilled in the art without departing from the spirit or scope of the novel concepts of the present invention, which should be determined by the appended claims.

I claim as my invention:

1. A color television receiver having means for producing three primary colors and a hue adjusting arrangement comprising:

luminance signal selecting means for separating a luminance signal from a composite color video signal;

chrominance signal selecting means for separating a chrominance signal from said composite color video signal;

sync signal separating means for separating a horizontal sync signal and a vertical sync signal from said composite color video signal;

luminance signal amplifying means connected to said luminance signal selecting means and having blanking means;

blanking signal supplying means for supplying a blanking signal to said blanking means;

color demodulating means connected to said chrominance signal selecting means;

hue control means connected with said color demodulating means;

matrix means for adding demodulated color difference signals to said luminance signal and supplying a color television signal to a cathode ray tube;

pulse forming means connected to said sync signal separating means for feeding pulse signals to said blanking signal supplying means and being effective to blank one part of a television picture on a screen of said cathode ray tube;

first reference color signal generating means for producing a first set of three reference color signals for separately displaying predetermined strenghts of at least said three primary colors in first, second and third blanked areas of said screen, means responsive to a setting of said hue control means for mixing one of the remaining two of said three primary colors with the primary color in at least one of said first, second and third areas of said screen in dependence on the direction and magnitude of a difference between the setting of said hue control means and a hue center; and second reference color signal generating means for producing a second set of three reference color signals for separately displaying only predetermined strenghts of a different one of said three primary colors in each of fourth, fifth and sixth blanked areas respectively of said screen, the hue of said three primary colors in said fourth, fifth and sixth blanked areas being independent of the setting of said hue control means.

2. A color television receiver having a hue adjusting arrangement comprising:

means for receiving a color television signal;

means for separating three primary color television signals from said color television signal;

a color image reproducing device for displaying a reproduced television picture;

means for supplying said three primary color television signals to said color image reproducing device;

means for controlling the hue of the reproduced television picture on said color image reproducing device;

means for blanking a predetermined area of said reproduced television picture;

means for displaying a first reference color in one part of said predetermined area, said first reference color containing a predetermined strength of one of said three primary colors plus one of the other two of said primary colors in relation to a direction of adjustment of said means for controlling hue from a hue center, said one of the other two of said primary colors having a strength proportional to an amount of adjustment of said means for controlling hue from said hue center, the strength of said other two of said primary colors in said first reference color being zero when a condition of said means for controlling hue is equal to hue center; and means for displaying a second reference color signal in another part of said predetermined area, said second reference color signal containing the same predetermined strength of the same one of said three primary colors which is displayed in said one part of said predetermined area, the hue of said second reference color signal being independent of adjustment of said means for controlling hue.

3. A color television receiver having a hue adjusting arrangement according to claim 2; wherein said color television signal includes first and second synchronizing signals, said first synchronizing signals occurring at a greater frequency than said second synchronizing signals; said means for generating first and second reference color signals includes first pulse generator means for providing first timing pulses at predetermined time with respect to said second synchronizing signals, means for providing said primary color television signals at predetermined times established by said first timing pulses, and color signal generating circuit means for providing said first reference color signal during a predetermined time period determined in response to said second timing pulses and for providing said second reference color signal at another predetermined time period determined in response to said second timing pulses; and said means for blanking a predetermined area includes a logic circuit permitting blanking in response to the simultaneous occurrence of said first and second timing pulses.

4. A color television receiver having a hue adjusting arrangement comprising:
   means for receiving a color television signal;
   means for separating three primary color television signals from said color television signal;
   a color image reproducing device for displaying a reproduced television picture;
   means for supplying said three primary color television signals to said color image reproducing device;
   means for controlling the hue of a reproduced television picture on said color image reproducing device;
   means for blanking a predetermined area of said reproduced television picture;
   means for generating a first reference color signal for displaying a first reference color in one part of said predetermined area, the hue of which is varied in response to the condition of said means for controlling hue, and a second reference color signal for displaying a second reference color in another part of said predetermined area, the hue of which is fixed;
   means for supplying said first and second color reference signals to said color image reproducing device;
   said color television signal including first and second synchronizing signals;
   said first synchronizing signal occurring at a greater frequency than said second synchronizing signal;
   said means for generating first and second reference color signals including first pulse generator means for providing first timing pulses at predetermined time with respect to said second synchronizing signals;
   means for providing said primary color television signals at predetermined times established by said firt timing pulses;
   color signal generating circuit means for providing said first reference color signal during a predetermined time period determined in response to said second timing pulses and for providing said second reference color signal at another predetermined time period determined in response to said second timing pulses;
   said means for blanking a predetermined area including a logic circuit permitting blanking in response to the simultaneous occurrence of said first and second timing pulses;
   said color signal generating circuit means including adjustable means linked with said means for controlling hue and providing a current whose level depends on the condition of said means for controlling hue, said adjustable means having a hue-center position at which no adjustment in hue is effected, means for providing a hue-deviation level corresponding with the magnitude of deviation of said adjustable means from its hue-center position; means for providing a direction level corresponding to the direction of deviation of said manual hue adjusting means from its hue-center position; and means for providing said first reference color signal in response to said hue-deviation level and said direction level.

5. A color television receiver having a hue adjusting arrangement according to claim 4; wherein said means for providing said first reference color signal includes means for establishing for a predetermined length of time during said predetermined time period, fixed level corresponding to one of the primary colors, and another level corresponding to another of the primary colors, said direction level determining the other primary color to which said other level corresponds, and said hue-deviation level determining the amplitude of said other level, and said levels are supplied to said color image reproducing device.

6. A color television receiver having a hue adjusting arrangement according to claim 5; wherein said first timing pulses include respective pulses for each of the primary colors and said means for establishing said fixed level and said other level includes, for each primary color, a group of three transistors having power terminals connected to a power source and output terminals connected together to a common load to provide an output signal, each of said transistors having an input terminal connected to receive a respective one of said first timing pulses, two of said transistors each receiving said first timing pulses corresponding to a respective one of the other two primary colors and having their input terminals connected to receive said hue-deviation level, the conductance of each of said two transistors being determined by said direction level, and said output signal providing said first reference color signal.

7. A color television receiver having a hue adjusting arrangement according to claim 4; wherein said means for providing a hue-deviation level includes a transistor having collector, emitter and base electrodes, an emitter load connected between said emitter electrode and a reference potential, and a collector load connected between said collector electrode and a voltage source, said base electrode being connected to receive a level provided from said adjustable means, said transistor being biased to reach maximum conductance when said adjustable means is in said hue-center position, whereby said hue-deviation level is provided at said collector electrode and said hue-deviation level reaches an extreme value in one direction when said adjustable means is at the hue-center position and varies in the other direction depending only on the magnitude of deviation of said adjustable means from said hue-center position.

8. A color television receiver having a hue adjusting arrangement according to claim 4; wherein said means for providing a direction level includes a differential amplifier having an output and first and second inputs, said first input receiving the level provided by said adjustable means, said second input receiving a predetermined level equal to the level of said adjustable means when the latter is at its hue-center position, and said output of the differential providing said direction level at a first value when the level of said adjustable means is below said predetermined level and at a second value when the level of said adjustable means is above said predetermined level.

9. A hue adjusting arrangement for use in conjunction with a color television receiver that includes means for receiving a color television signal, means for separating three primary color television signals from the color television signal, a color image reproducing device for displaying a reproduced television picture, means for supplying said three primary color television signals to said color image reproducing device, and means for controlling hue of the reproduced television picture on said color image reproducing device: said hue adjusting arrangement comprising means for blanking a predetermined area of said reproduced television picture;

means for generating a first reference color signal to display a first reference color in one part of said predetermined area, said first reference color consisting of a predetermined strength of one of said three primary color television signals independently of the condition of said means for controlling hue plus one of the other two primary color television signals in dependence on a direction of adjustment of said means for controlling hue from a hue center, said one of the other two primary color television signals having a strength in dependence on a magnitude of adjustment of said means for controlling hue from a hue center, and means for generating a second reference color signal to display a second reference color in another part of said predetermined area, said second reference color containing only the same one of said three primary color television signals having a predetermined strength in said first reference color, and the hue of which is fixed; and means for supplying said first and second reference color signals to said color image reproducing device.

10. A hue adjusting arrangement according to claim 9; wherein said color television signal includes first and second synchronizing signals, said first synchronizing signal occurring at a greater frequency than said second synchronizing signals; said means for generating the first and second reference color signals includes a first pulse generator means for providing first timing pulses at predetermined times with respect to said first synchronizing signals and second timing pulses at predetermined times with respect to said second synchronizing signals, means for providing said primary color television signals at predetermined times established by said first timing pulses, and color signal generating circuit means for providing said first reference color signal during a predetermined time period determined in response to said second timing pulses and for providing said second reference color signal at another predetermined time period determined in response to said second timing pulses; and said means for blanking a predetermined area includes a logic circuit permitting blanking in response to simultaneous occurrence of said first and second timing pulses.

11. A hue adjusting arrangement for use in conjunction with a color television receiver that includes means for receiving a color television signal, means for separating three primary color television signals from the color television signal, a color image reproducing device for displaying a reproduced television picture, means for supplying said three primary color television signals to said color image reproducing device, means for controlling hue of the reproduced television picture on said color image reproducing device: said hue adjusting arrangement comprising means for blanking a predetermined area of said reproduced television picture; means for generating a first reference color signal to display a first reference color in one part of said predetermined area and the hue of which is varied in response to the condition of said means for controlling hue, and a second reference color signal to display a second reference color in another part of said predetermined area, and the hue of which is fixed; means for supplying said first and second reference color signals to said color image reproducing device; said color television signal including first and second synchronizing signals, said first synchronizing signal occurring at a greater frequency than said second synchronizing signals; said means for generating the first and second reference color signals includes a first pulse generator means for providing first timing pulses at predetermined times with respect to said first synchronizing signals and second timing pulses at predetermined times with respect to said second synchronzing signals, means for providing said primary color television signals at predetermined times established by said first timing pulses, and color signal generating circuit means for providing said first reference color signal during a predetermined time period determined in response to said second timing pulses and for providing said second reference color signal at another predetermined time period determined in response to said second timing pulses; said means for blanking a predetermined area includes a logic circuit permitting blanking in response to simultaneous occurrence of said first and second timing pulses; said color signal generating circuit means including adjustable means linked with said means for controlling hue and providing a current whose level depends on the condition of said means for controlling hue and having a hue-center position at which no adjustment in hue is effected, means for providing a hue-deviation level corresponding with the magnitude of deviation of said adjustable means from its hue-center position, means for providing a direction level corresponding to the direction of deviation of said manual hue adjusting means from its hue-center position, and means for providing said first reference color signal in response to said hue-deviation level and said direction level.

12. A hue adjusting arrangement according to claim 11; wherein said means for providing said first reference color signals includes means for providing, for a predetermined length of time during said predetermined time period, a fixed level corresponding to one of the primary colors, and another level corresponding to another of the primary colors, said direction level determines said other primary color to which said other level corresponds, said hue-deviation level determines the amplitude of said other level, and said levels are supplied to said color image reproducing device.

13. A hue adjusting arrangement according to claim 12, wherein said first timing pulses include respective pulses for each of the primary colors and said means for providing said fixed and said other level includes, for each primary color, a group of three transistors having power terminals connected together to a power source and output terminals connected together to a common load to provide an output signal, each of said transistors further having an input terminal connected to receive a respective one of said first timing pulses, two of said transistors each receiving said first timing pulses for a respective one of the other two primary colors and having their input terminals connected to receive said hue-deviation level, the conductance of each of said two transistors being determined by said direction level, said output signal providing said first reference color signal.

14. A hue adjusting arrangement according to claim 11; wherein said means for providing a hue-deviation level includes a transistor having collector, emitter and base electrodes, an emitter load connected between said emitter electrode and a reference potential, and a collector load connected between said collector electrode and a voltage source, said base electrode being connected to receive the level provided from said adjustable means, said transistor being biased to reach maximum conductance when said adjustable means is in its hue-center position, whereby said hue-deviation level is provided at said collector electrode and said hue-deviation level reaches an extreme value in one direction when said adjustable means is at the hue-center position and varies in the other direction depending only on the magnitude of deviation of said adjustable means from said hue-center position.

15. A hue adjusting arrangement according to claim 11; wherein said means for providing a direction level includes a differential amplifier having an output and first and second inputs, said first input receiving the level provided by said adjustable means, said second input receiving a predetermined level equal to the level of said adjustable means when the latter is at its hue-center position, and said output providing said direction level at a first value when the level of said adjustable means is below said predetermined level and at a second value when the level of said adjustable means is above said predetermined level.

* * * * *